United States Patent Office 3,130,184
Patented Apr. 21, 1964

3,130,184
PROCESS OF PREPARING POLYMERS FROM ALKALI METAL SALTS OF β-ALKYLISE-THIONATES
Leslie M. Schenck, Mountainside, and John H. Shown, Westfield, N.J., assignors to General Aniline & Film Corporation, New York, N.Y., a corporation of Delaware
No Drawing. Filed Oct. 20, 1960, Ser. No. 63,714
5 Claims. (Cl. 260—79.3)

This invention relates to a process of preparing polymers from alkali metal salts of β-alkylisethionates.

In our copending application Serial No. 62,087 filed on October 12, 1960, we describe and claim a new and novel process of preparing alkali metal salts of β-alkylvinylsulfonates by thermal dehydration of alkali metal salts of β-alkylisethionates at a pH between 9.7 and 11.7 and a temperature between 120° C. and 210° C. In our further experiments with this process, we discovered that the gradual polymerization of unstabilized β-alkylvinylsulfonates, which transpires at ambient temperatures, can be promoted without isolation of the monometric intermediate, alkali metal β-alkylvinylsulfonate.

Accordingly, it is the principal object of the present invention to provide a new method for the preparation of useful polymers derived from alkali metal salts of β-alkylisethionates, often referred to as alkali metal salts of hydroxyalkane sulfonates, by a new process which involves the dehydration and subsequent polymerization of the resulting unsaturate.

Other objects and advantages will become more clearly evident from the following description.

We have discovered that alkali metal salts of β-alkylisethionates are readily dehydrated at a pH ranging between 6 and 9 and a temperature of 120° to 250° C. with the elimination of water and at the same time yielding a monomer, i.e., an alkali metal salt of a β-alkylvinylsulfonate, which undergoes polymerization under the conditions of reaction pH and reaction temperature. We further discovered that the polymerization reaction is driven to completion by maintaining the reaction mixture within the specified temperature range for a period of time ranging from 1 to 5 hours within the specified pH range. In this connection, it is to be noted that the dehydration followed by polymerization will not take place if the pH of the reaction mixture is maintained above a pH of 9 and up.

In conducting our process, the desired weight of an alkali metal salt of a β-alkylisethionate is charged to a reactor and sufficinet alkali added so that a 10% aqueous solution of the mixture indicates a pH between 6 and 9, preferably around a pH of 7 but not exceeding a pH of 9. This alkali may be sodium hydroxide, sodium carbonate, potassium hydroxide, lithium hydroxide or the like. If desired, an inert diluent such as mineral oil, chlorobenzene, xylene, etc., may be added. In either case, with or without a diluent, the reaction mixture is heated to the temperature range indicated above, at reduced or atmospheric pressure, and reacted until conversion of the alkali metal salt of the hydroxyalkyl sulfonate to the corresponding alkali metal salt of β-alkyl vinyl sulfonate and the polymerization thereof is complete. The reaction may be followed by measuring the amount of unsaturation by the iodine number, by the weight of water eliminated, or by any other appropriate analytical method. In practice, we found that the bromide-bromate method for the determination of iodine numbers is satisfactory. When the iodine number is within the range between 2 and 6, and approximately a molar equivalent of water has been eliminated, this is indicative that substantial polymerization has occurred and that the resulting product is satisfactory for use as such as an anionic surface active agent for textiles, as a dispersing agent, adjuvant in drilling muds, etc. Other uses and applications will be referred to hereinafter. The resulting polymer may be characterized by the following formula:

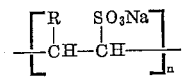

wherein R represents an alkyl group of from 1 to 4 carbon atoms and $n$ is indicative of the number of units in the polymer chain and such units range from 2 to 50.

With sodium-β-methyl vinyl sulfonate, the polymer thereof may be characterized, for purposes of illustration, as follows:

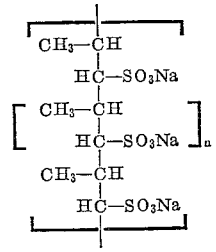

wherein $n$ has the same value as above.

For the dehydration and polymerization reaction the temperature should be maintained not lower than 120° and not higher than 250° C. The preferred temperature range, if an insert solvent is employed, should be between 120 and 170° C. and between 170 and 250, preferably between 170 and 230, if no heat transfer medium i.e., inert solvent diluent, is admixed with the dry alkali metal salt of β-alkylisethionate.

As examples of hydroxyalkane sulfonates (β-alkyl isethionates) in the form of the sodium, potassium or lithium salts, which are converted to the β-alkyl vinyl sulfonates and subsequently polymerized, the following are illustrative:

β-Methyl-sodium, potassium or lithium isethionate
β-Ethyl-sodium, potassium or lithium isethionate
β-Propyl-sodium, potassium or lithium isethionate
β-Butyl-sodium, potassium or lithium isethionate The following examples will describe in greater detail the process involved for preparing the polymers. All parts given are by weight unless otherwise noted.

*Example I*

One hundred parts of β-methyl-sodium isethionate is adjusted with sodium hydroxide until a 10% aqueous solution of the admixture has a pH of 8.5. The reaction mixture is heated 1¾ hours at 230° C. under 2 mm. pressure. There is eliminated 11 parts of water during the heating period. The resultant polymer is a white amorphous water-soluble solid with an iodine number of 2.5 and useful as a dispersant in textile applications and as an electroplating bath additive without further purification.

*Example II*

Example I was repeated with the exception that 100 parts of β-ethyl sodium isethionate was substituted for β-methyl sodium isethionate. There was eliminated 9.8 parts of water during the reaction. The resultant polymer had an iodine number of 3.1.

*Example III*

Example I was repeated with the exception that 100 parts of β-butyl sodium isethionate was substituted for β-methyl sodium isethionate. During the dehydration and polymerization reaction there was eliminated 8.6 parts of water. The polymer thus formed had an iodine number of 4.3.

*Example IV*

125 parts of β-propyl-potassium isethionate was adjusted with a sufficient amount of potassium hydroxide until a 10% aqueous solution of the admixture had a pH of 8. The reaction mixture was heated for approximately 2 hours at 232° C. under 2 mm. of pressure. During this period of time there were eliminated 10.7 parts of water. The resultant polymer was a white amorphous water-soluble solid with an iodine number of 2.5. Molecular weight analysis by the freezing point depression method indicated that the polymer container 9 units of polymerized β-butyl-potassium isethionate vinyl sulfonate.

The polymers as obtained above may also be incorporated with fillers such as carbon black, zinc oxide, and the like, vulcanizing agents such as sulfur, vulcanization accelerators, plasticizing agents, and dyestuffs.

These polymers are characterized by high thermal stability, and are unaffected by heating at temperatures in the range of 200° C., at which temperature some of the copolymers soften. The polymers may be combined to enhance the useful properties of plasticizers, stabilizers, fillers, pigments, dyes, softeners, natural or synthetic resins, binders and molding powders.

We claim:
1. The process of preparing homopolymers of alkali-metal β-alkyl vinyl sulfonates which comprises heating an alkali metal salt of a β-alkylisethionate in which the alkyl group contains from 1 to 4 carbon atoms at a pH between 6 and 9 and a temperature between 120–250° C.
2. The process according to claim 1 wherein the β-alkylisethionate is β-methylisethionate.
3. The process according to claim 1 wherein the β-alkylisethionate is β-ethylisethionate.
4. The process according to claim 1 wherein the β-alkylisethionate is β-propylisethionate.
5. The process according to claim 1 wherein the β-alkylisethionate is β-butylisethionate.

References Cited in the file of this patent
Kohler: Am. J. Chem. 20, pages 680–683 (1898).
Breslow: J. Am. Chem. Soc. 76, page 6399, 1954.